United States patent office.

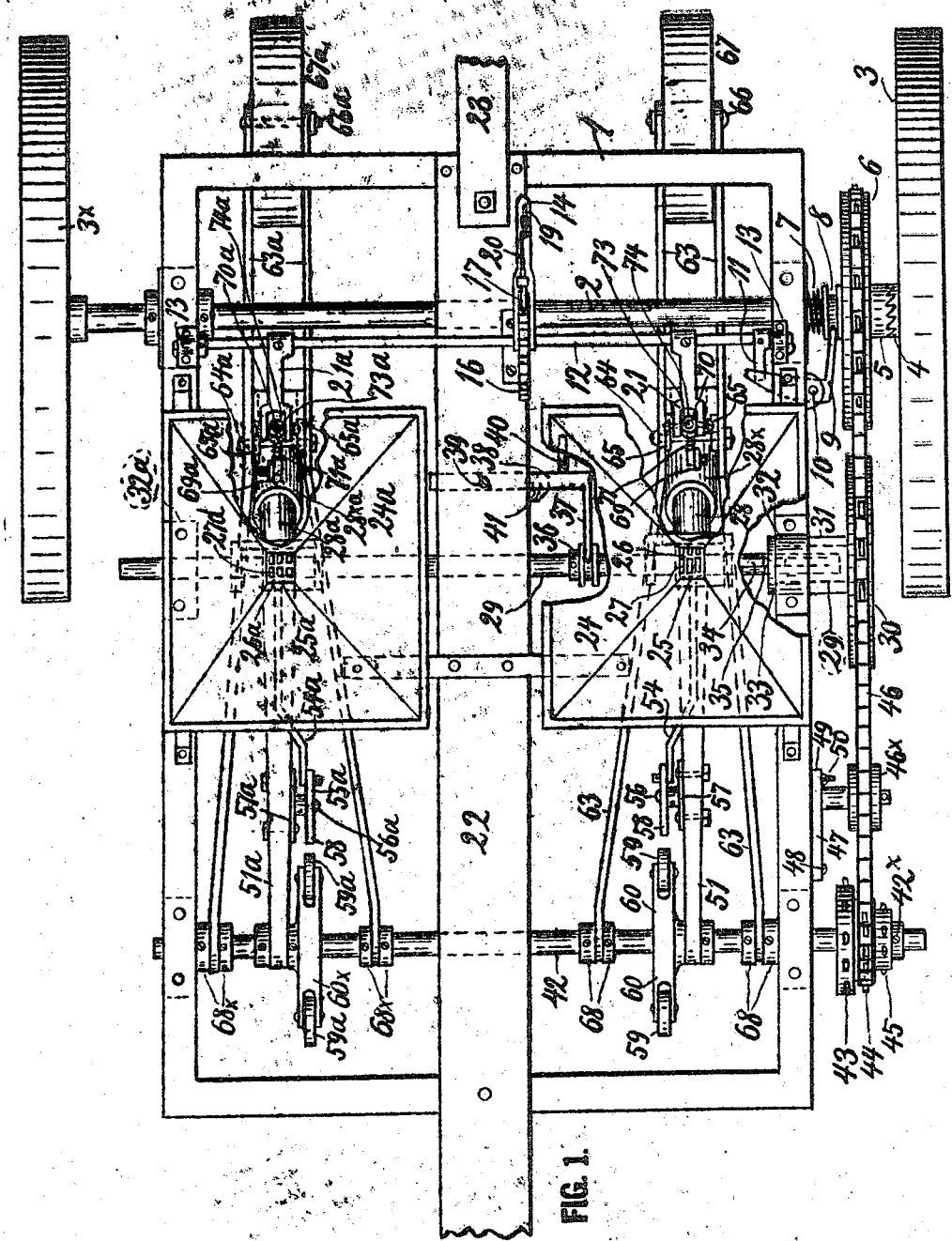

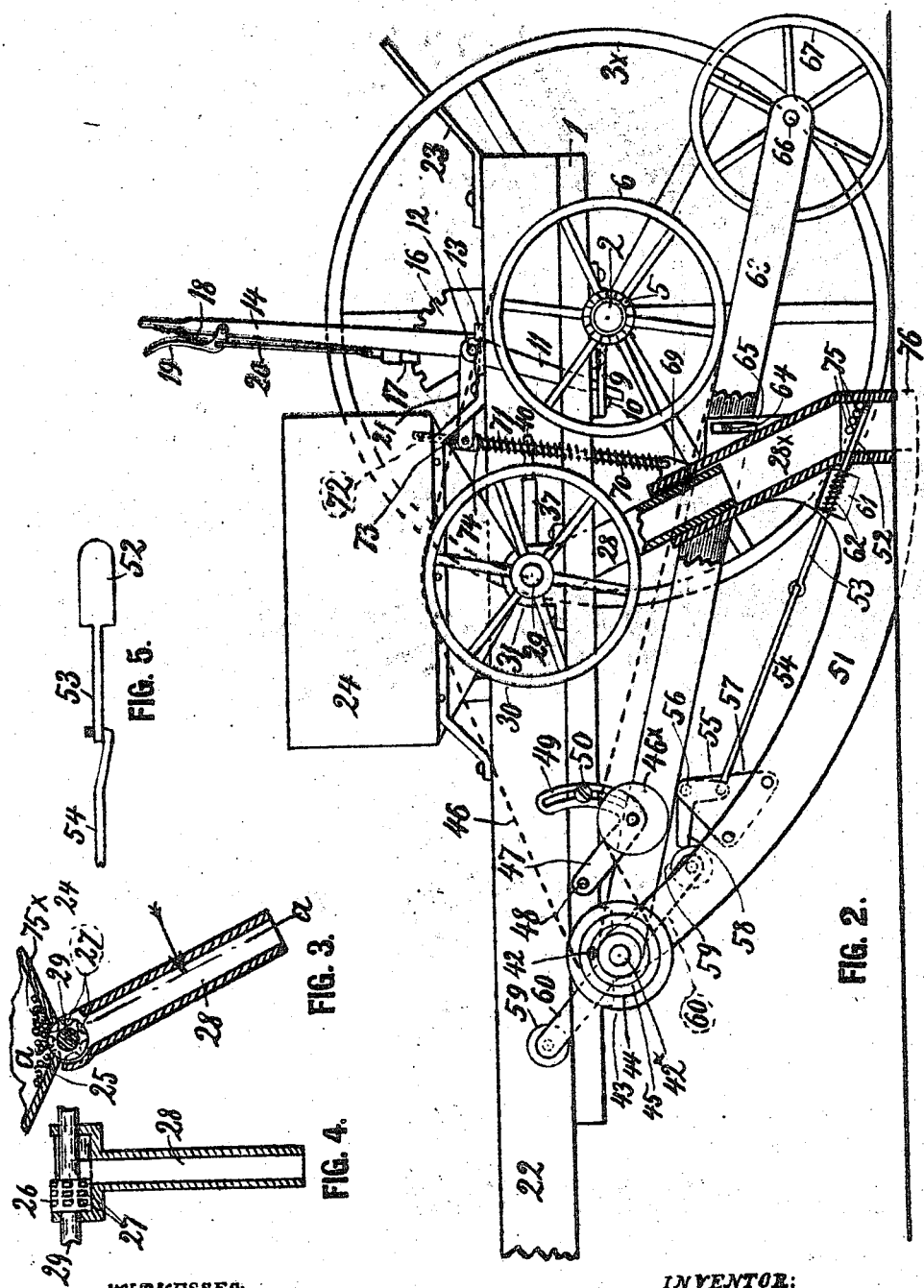

Sóren Sórensen, of worland, wyoming.

seeding-machine.

1,045,624.   Specification of Letters Patent.   Patented Nov. 26, 1912.

Application filed March 18, 1912. Serial No. 684,522.

*To all whom it may concern:*

Be it known that I, Sóren Sórensen, a subject of the King of Denmark, residing at Worland, in the county of Bighorn and State of Wyoming, have invented a new and useful Seeding-Machine, of which the following is a specification.

My invention relates to seed planting machines for small seeds of any kind, but is especially intended for planting beet seed. Heretofore beet seed has usually been sowed broadcast, or at best in continuous rows so close together that after the seed has sprouted it has been necessary to "thin it out" by removing about three-fourths of the sprouts and their roots; and as such removed plants are usually unfit for replanting there is that much waste of seed besides the loss of time required to do the so-called "thinning."

The object of the invention is to avoid the loss of seed and time or labor just mentioned; also to further enlarge and improve the seeding machine described in my United States Patent No. 981,704, which was granted to me on the 17th day of January, 1911. And I attain said objects by the construction and combination of parts illustrated in the accompanying drawings, in which—

Figure 1 is a top or plan view of my improved seeder with portions of the hoppers broken away. Fig. 2 is a side elevation of the machine shown in Fig. 1 with one of the supporting wheels removed and the lower portion of the dropping tube shown in section. Fig. 3 is a longitudinal central section of the upper member 28 of one of the seed dropping tubes and a portion of the seed hopper adjacent the upper end thereof and an end view of the shaft and seed delivering wheel in the bottom of the hopper. Fig. 4 is a section on the line *a—a* Fig. 3 of the tube member 28 and a side view of the shaft and seed wheel in the upper end thereof. Fig. 5 is a detail top view of one of the seed dropping shutters 52 shown near the bottom of Fig. 2, and a portion of the rod operating it.

Referring to the drawing by reference numerals, 1 designates the main frame, which is supported by a shaft or axle 2 and two supporting wheels $3^x$ and 3 of which the latter has its hub formed with a clutch member 4, adapted to engage a clutch member 5, which is formed on the hub of a sprocket 6 that is loosely journaled on said shaft and is normally held by a spring 7 with said clutch members engaged, but the inner end of the hub has an annular groove 8, engaged by an L-shaped lever 9, that is pivoted at 10 to the frame and has its inner end disposed for engagement by a radial arm 11, which is fixed on a rock shaft 12. The latter shaft is journaled in bearings 13 on the frame and on it is fixed a hand lever 14, which straddles a toothed sector 16, that is fixed on the frame and engaged by a dog 17, which is mounted to slide on the lever and is held engaged with the sector by a spring 18, which acts on a finger lever 19; the latter is pivoted on the hand lever and will disengage the dog when operated by the fingers of the hand grasping the hand lever, a rod 20 connecting the dog with the finger lever. On the shaft 12 are also fixed two forked arms 21, 21ª the purpose of which will presently be further described.

Secured centrally along the frame is a draft pole 22, to which animals or other motive power may be hitched for drawing the machine and supporting the pole. Upon the rear end of the pole is fixed a support 23 for a seat (not shown).

Mounted upon the frame are two seed hoppers 24, 24ª, which, together with several other parts relating thereto, being the same in the right and the left half of the machine need only be described in one side and the corresponding parts in the other side will be designated by the same numerals and the letter "a" as an exponent.

In an opening 25 in the bottom of the hopper rotates a wheel 26, having several circular rows of pockets 27 by which feed seeds $75^x$ (see Fig. 3) from the hopper is fed in to a seed conveying tube, which is composed of an upper member 28, and a lower member $28^x$ sliding loosely on the upper member; as best shown in Fig. 2, the upper member is supported by a shaft 29, on which the seed wheel 26 is fixed so as to rotate and slide with the shaft. Said shaft is journaled across the frame and has one end slidably inserted in a long hub 29 of a sprocket 30; said hub rotates in a sleeve 31 of the bearing 32 on the frame and is retained in said bearing by a collar 33. The portion of the shaft 29 that slides in the hub is provided with a key-way 34, in which slides a key 35 that is fixed in the hub. On the shaft 29 is also fixed a grooved collar 36, which is engaged by a shifter fork 37, extending from a bar 38, that is slidable in a transverse hole in the pole and is adjustably held in said hole by a set screw 39. The sliding bar 38 may have a handle 40, and graduation marks 41, each of which when moved close to the pole will cause the shifter to move the shaft 29 and thereby the seed wheel with one of its circles of pockets into idle position beyond the opening in the hopper bottom.

Journaled across the front end of the frame is a shaft 42, one end of which extends beyond the frame and has secured upon it by a set screw 42× a cone composed of differently sized sprockets 43, 44, 45 either of which by means of the set screw may be moved into line with and operated by a link belt 46, which is driven by the sprocket 6 and rotates the sprocket 30. In order to make said link belt fit and operate the several sprockets 43, 44, 45, I provide it with a stretcher pulley or idler 46×, which is mounted on a support 47, that is pivoted at 48 to the frame and has a segmental slotted arm 49, through which passes into the frame a screw 50 by which the support may be clamped against the frame and thus hold the stretcher pulley in any desired adjusted position.

Journaled on the shaft 42 are the front ends of two furrow opening runners 51, 51ª, each of which carries upon its rear end the lower member 28× of the seed-dropping tube. In the lower end of said member is arranged a slidable shutter 52, having a rod 53 connected by a link rod 54 to a bell-crank lever 55, which is pivoted at 56 to a bracket 57 on the runner; the forward arm 58 of said lever extends into the circular path of two antifriction pulleys 59, which are mounted in two opposite radial arms 60 fixed on the shaft 42. In a clearing 61 near the rear end of the runner is placed a spring 62, which acts against the rear end of the shutter to hold it normally shut.

The lower section 28× of the seed tube is guided between two flat bars 63 said bars having a bolt 64 passed through them and through vertically slotted lugs 65 on the tube section. Between the rear ends of said bars is journaled on a bolt 66 a wheel 67 which serves to close the furrow and thus cover the deposited seed. The front half or so of said bars are spread to a bracing position and have their front ends journaled on the shaft 42 between collars 68.

The tube section 28× is also provided with another lug 69, (see Fig. 2) from which extends upwardly a rod 70 encircled by a partly compressed spring 71 and having near its upper end a series of holes 72 and a pin 73 is movable into either of said holes. Between said pin and the top of the spring is a slidable collar 74, which is trunnioned in the forked arm 21.

In the operation of the machine the hoppers 24, 24ª are supplied with seed and according to the size of the seed and the number of seeds to be planted in each hill, the seed wheels 26, 26ª are adjusted with many or few rows of their seed pockets into the bottom openings of the hoppers, said adjustment being made by the shifter 37 and observed at the graduation mark 41. The distance between the hills in each row planted is determined by the size of the sprockets 43, 44, 45 on which the link bolt 46 is placed, the runners 51, 51ª are then lowered into the ground by swinging the lever 14 forward; said motion of the lever also acting through the arm 11 and shifter 9 permitting the spring 7 to move the sprocket 6 with its clutch member slightly outward and thus into engagement with the clutch member 4 of the ground wheel 3. As the machine is then drawn forward seeds will be dropped down the seed tubes and accumulated upon the shutters, as shown at 75 in Fig. 2, until the shutters are pulled open by the rods 54, 54ª and other mechanism, as described, when the charge of seed on each shutter will be deposited in the shallow furrow opened by the runner and after the open rear ends 76 of the runners have moved forward away from the seed, the wheels 67, 67ª close the furrows and leave the seeds planted in spaced hills in each row or as many rows as there are runners.

If during the operation the runners and the wheels 67, 67ª pass over uneven ground the springs 71, 71ª will yield without swinging the arms 21, 21ª or the hand lever 14. The depth of the furrows is regulated by the bolts 64, 64ª, it being understood that the bars 63, 63ª are at all times during operation supported by the wheels 67, 67ª, and by the shaft 42 and the pole, which is supported by the draft animals and by the main wheels 3, 3×, so that vertical adjustment of the bolts 64, 64ª will change the depth of the runners in the ground. When the machine is to be driven idle the hand lever 14 is thrown rearward until the rods 70, 70ª lift the runners and the wheels 67, 67ª above the ground, and the arm 11 acting on the shifter 9 throws the sprocket 6 out of clutch with the ground wheel 3, and the machine rides only on the large supporting wheels with its front end supported by the pole and the draft animals.

What I claim is:

1. In a planting machine, the combination with a main frame, of a shaft supporting the same, a supporting wheel at each end of the shaft, a plurality of seed hoppers mounted on the frame and having each an aperture in its bottom, a shaft journaled across the frame near below the apertures, a seed feeding wheel fixed on the shaft adjacent each aperture and having each a series of peripherical rows of seed pockets, means for adjusting the shaft longitudinally so as to bring few or many of the rows of pockets beyond each aperture, a bearing on the frame, a sprocket wheel having its hub journaled in the bearing, said shaft having one end slidably keyed in said hub, a sprocket, journaled on the supporting shaft, clutch connection between the latter sprocket and the adjacent supporting wheel, a link belt connecting said two sprockets, furrow-opening runners pivotally connected with their front ends in the forward end of the frame and having each at its rear end an upwardly disposed tubular portion forming the lower section of a seed conveying tube, an upper tube section loosely suspended into said lower section and having its upper end pivotally connected with the shaft having the seed feeding wheels; furrow closing wheels arranged one rearward of each runner, a hand lever mounted on the frame, means for holding the hand lever in different positions, operative connection between the hand lever and the runners and the furrow closing wheels to raise them above the ground, and means whereby the hand lever disengages the clutch from the supporting wheel the moment the runners are raised from the ground; a slidable spring-pressed shutter closing the tubular portion of each runner a bell-crank lever mounted near the front end of each runner and having one arm connected with the shutter rearward thereof, a front shaft journaled across the front portion of the frame, radial arms fixed on the shaft and arranged to actuate the other arm of the bell-crank lever when the shaft rotates, a series of sprockets of different sizes adjustably secured on said shaft, said link belt extending over one of said sprockets in the series and being long enough to engage either of them, an adjustable belt stretcher arranged on the frame for holding the link belt stretched when it is placed on any of the smaller sprockets in the series.

2. In a planting machine, the combination with the main frame, of a shaft supporting the same, a supporting wheel at each end of the shaft, a plurality of seed hoppers mounted on the frame and having each an aperture in its bottom, a shaft journaled across the frame near below the apertures, a seed feeding wheel fixed on the shaft adjacent each aperture and having each a series of peripherical rows of seed pockets, means for adjusting the shaft longitudinally so as to bring few or many of the rows of pockets beyond each aperture, a bearing on the frame, a sprocket wheel having its hub journaled in the bearing, said shaft having one end slidably keyed in said hub, a sprocket journaled on the supporting shaft, clutch connection between the latter sprocket and the adjacent supporting wheel, a link belt connecting said two sprockets, furrow-opening runners pivotally connected with their front ends in the forward end of the frame and having each at its rear end an upwardly disposed tubular portion forming the lower section of a seed conveying tube, an upper tube section loosely suspended into said lower section and having its upper end pivotally connected with the shaft having the seed feeding wheels; furrow closing wheels arranged one rearward of each runner, a hand lever mounted on the frame, means for holding the hand lever in different positions, operative connection between the hand lever and the runners and the furrow closing wheels to raise them above the ground, and means whereby the hand lever disengages the clutch from the supporting wheel the moment the runners are raised from the ground, a slidable spring pressed shutter closing the tubular portion of each runner, a bell-crank lever mounted near the front end of each runner and having one arm connected with the shutter rearward thereof, a front shaft journaled across the front portion of the frame, radial arms fixed on the shaft and arranged to actuate the other arm of the bell-crank lever when the shaft rotates, a series of sprockets of different sizes adjustably secured on said shaft; said link belt extending over one of said sprockets in the series and being long enough to engage either of them, an adjustable belt stretcher arranged on the frame for holding the link belt stretched when it is placed on any of the smaller sprockets in the series, said front shaft extending through the front ends of the runners; collars screw fastened on the front shaft, flat bars journaled with their front ends on the shaft between the collars and converging in pairs rearwardly to the sides of the tubular portion of the runner, vertically adjustable means securing the bars to the sides of said tubular portion, said bars extending also rearward of the runner and having the furrow closing wheel journaled between their rear ends.

In testimony whereof I affix my signature, in presence of two witnesses.

SOREN SÓRENSEN.

Witnesses:
J. R. SHANNAN,
B. S. LANDRUM.